United States Patent
Zhou et al.

(10) Patent No.: US 12,555,330 B2
(45) Date of Patent: Feb. 17, 2026

(54) EMPHASIZING EXTENDED REALITY CONTENT BASED ON USER INTENT

(71) Applicant: Snap Inc., Santa Monica, CA (US)

(72) Inventors: Kai Zhou, Wiener Neudorf (AT); Yubin Xi, San Jose, CA (US); Tianyi Sun, Culver City, CA (US); Su Hyun Lee, San Jose, CA (US)

(73) Assignee: Snap Inc., Santa Monica, CA (US)

( * ) Notice: Subject to any disclaimer, the term of this patent is extended or adjusted under 35 U.S.C. 154(b) by 281 days.

(21) Appl. No.: 18/353,555

(22) Filed: Jul. 17, 2023

(65) Prior Publication Data

US 2025/0029340 A1  Jan. 23, 2025

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 8,854,470 B2 | 10/2014 | Park et al. | |
| 9,165,381 B2 | 10/2015 | Latta et al. | |
| 9,710,973 B2 | 7/2017 | Bar-zeev et al. | |
| 10,719,939 B2 | 7/2020 | Holzer et al. | |
| 10,726,560 B2 | 7/2020 | Holzer et al. | |
| 10,855,936 B2 | 12/2020 | Holzer et al. | |
| 10,970,425 B2 | 4/2021 | Yang et al. | |
| 11,410,392 B2 | 8/2022 | Browy et al. | |
| 11,501,529 B2 | 11/2022 | Zahnert et al. | |
| 11,868,672 B1 * | 1/2024 | Dehkordi | G06F 9/451 |
| 12,046,232 B1 * | 7/2024 | Smith | G10L 15/22 |
| 2022/0318459 A1 * | 10/2022 | Narang | G06N 3/088 |

(Continued)

FOREIGN PATENT DOCUMENTS

| WO | WO-2014176591 A1 | 10/2014 |
|---|---|---|
| WO | WO-2021209854 A1 | 10/2021 |
| WO | WO-2025019492 A1 | 1/2025 |

OTHER PUBLICATIONS

"International Application Serial No. PCT/US2024/038204, International Search Report mailed Nov. 11, 2024", 4 pgs.

(Continued)

*Primary Examiner* — Yingchun He
(74) *Attorney, Agent, or Firm* — Schwegman Lundberg & Woessner, P.A.

(57) ABSTRACT

Described is a system for emphasizing XR content based on user intent by gathering interaction data from use of one or more interaction functions by a user, accessing a camera feed of a camera system from the XR device, analyzing a combination of data corresponding to the interaction data and the camera feed using a first machine learning model to identify a priority for individual media content items, and determining that a first subset of media content items are of a higher priority than a second subset of media content items. Then the system displays the media content items on the XR device of the user, the first subset of the media content items displayed differently than the second subset of the media content items based on the identified priority.

19 Claims, 16 Drawing Sheets

(56) References Cited

U.S. PATENT DOCUMENTS

| | | | |
|---|---|---|---|
| 2023/0138204 A1* | 5/2023 | Penugonda | G02B 27/017 |
| | | | 715/705 |
| 2023/0169734 A1 | 6/2023 | Alexander et al. | |
| 2023/0186624 A1 | 6/2023 | Bhatnagar et al. | |
| 2023/0214966 A1* | 7/2023 | Santhar | G06T 5/60 |
| | | | 345/633 |
| 2024/0005387 A1* | 1/2024 | Goldberg | G06V 10/82 |

OTHER PUBLICATIONS

"International Application Serial No. PCT/US2024/038204, Written Opinion mailed Nov. 11, 2024", 11 pgs.

Wagner, Daniel, "Motion to Photon Latency in Mobile AR and VR", Medium, [Online]. Retrieved from the Internet: <URL: https://medium.com/@DAQRI/motion-to-photon-latency-in-mobile-ar-and-vr-99f82c480926>, (Aug. 20, 2018), 27 pgs.

\* cited by examiner

Responds: "Praying for victory, I think." There [crude remarks] not only display the pervasive racism perpetuated against Muslims, but it highlights the interplay between the theatrical elements of wrestling and Orientalist discourses. The Sheik's visual presence is very much in line with what Said calls Orientalist tropes. The robe and the kaffiyb exemplify such tropes, as does the word shek, which in Arabic denotes veneration. More interesting, these tropes are distinctly Arab, yet are being applied to an Iranian. That is, long-flowing robes and kuffyb are elements of Arab clothing and customs -albeit caricatured in the wrestling arena. The camel, of course, is another stereotype of the Middle East that pervades American depictions of the region. The importance of such figures to Orientalist discourse ..... is a set of representative figures, or tropes. These figures are to the actual Orient....as stylized costumes are to characters in a King of a cross between a symbol + a circle

FIG. 7

EMPHASIZING EXTENDED REALITY CONTENT BASED ON USER INTENT

TECHNICAL FIELD

The present disclosure relates generally to Extended Reality (XR) content, and more specifically to emphasizing certain XR content.

BACKGROUND

XR is experiencing a significant increase in adoption across various industries and sectors. XR technology creates a fully 3D virtual world and/or overlays digital information, virtual objects, or computer-generated elements onto the real-world environment, enhancing users' perception and interaction with their surroundings. The growing use of XR is transforming numerous domains, including entertainment, gaming, retail, healthcare, education, and manufacturing. XR enables immersive experiences, such as interactive virtual simulations, virtual try-on for products, real-time data visualization, and enhanced training scenarios. With advancements in XR hardware, software, and mobile devices, along with its ability to provide engaging and personalized experiences, the use of XR is expanding rapidly, unlocking new possibilities and driving innovation in numerous fields.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 7 illustrates text whereby subsets of media content items of text are displayed differently, according to some examples.

DETAILED DESCRIPTION

Figure 1:
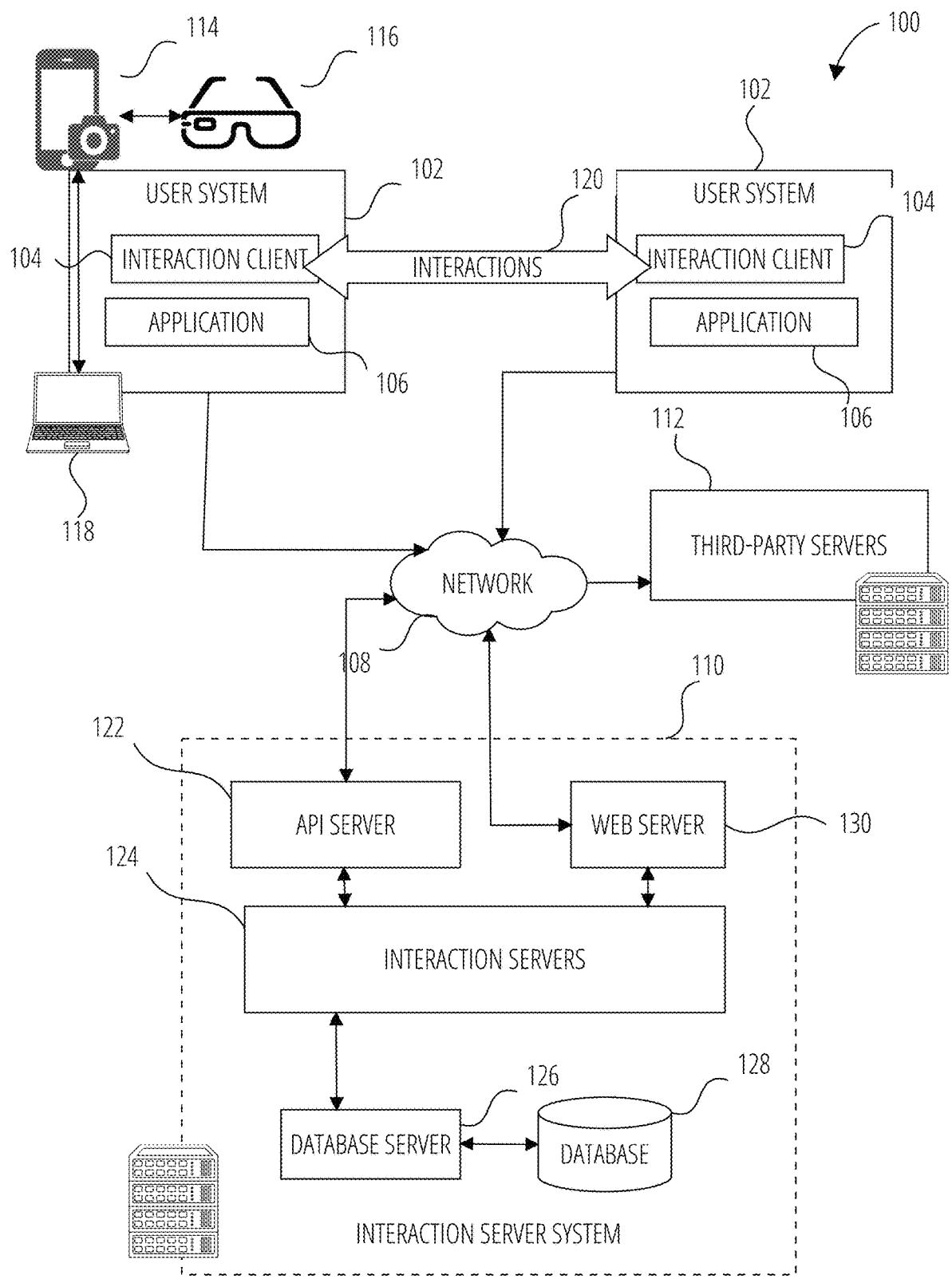
FIG. 1 is a diagrammatic representation of a networked environment in which the present disclosure may be deployed, according to some examples.

Traditional systems in the field of XR and machine learning typically focus on user inputs and pre-defined program responses. These traditional systems rely heavily on explicit user interactions, such as touch gestures or voice commands, to interact with the XR environment, resulting in challenges adapting to a user's specific needs or intentions because of the lack of ability to interpret implicit user data and context.

Some traditional XR systems may not consider users' contextual surroundings when presenting XR content. This could lead to a mismatch between the XR content and the real-world environment, reducing the users' sense of immersion and potentially causing confusion with irrelevant content.

Another challenge is that user interactions with traditional systems are often rigid and limited. Users need to perform specific actions to interact with XR content. This can be unnatural and interruptive, particularly in scenarios where hands-free operation would be advantageous or more intuitive.

Moreover, some traditional XR systems often do not provide personalized content based on the user's preferences, needs, or past interactions. Instead, the same XR experience is often presented to all users in response to users' selection of a particular user interface element, which may not be relevant or engaging for every individual.

In addition, traditional systems typically rely on explicit commands from users and may not interpret user intent effectively. As a result, they may fail to deliver the most relevant XR content for the user's current situation or needs, especially if these commands are interpreted incorrectly or out of context.

Furthermore, traditional systems may not have mechanisms to emphasize certain XR content over others based on user intent, which is particularly troublesome in modern times where XR content is abundant. This could lead to an overload of irrelevant information, making it hard for users to focus on what's important.

The interaction systems described herein mitigate or eliminate these challenges by analyzing user interaction data using machine learning models, and/or understanding the user's environment using computer vision models on a live camera feed to better infer user intent and context, which then is used to emphasizing relevant XR content accordingly.

By using machine learning and computer vision technology, the interaction client assesses a live camera feed to identify objects and surroundings of the user, allowing the system to have better context awareness and identifying more relevant XR content to the real-world environment and enhancing user's immersion.

By using machine learning on user interaction data, the interaction client can infer user intent without the need for explicit commands and/or to supplement or modify a prompt of a user. This can enable more natural and intuitive interactions with the XR environment.

The system provides more personalized XR experiences by understanding the user's intent and preferences. By analyzing past user interaction data, the system can suggest XR content that aligns with the user's habits or preferences, thereby delivering a more engaging and personalized user experience.

The technology emphasizes certain XR content over others based on the determined user intent. Emphasis can include adjusting certain parameters such as color, placement, size, order of content display, and/or the like. This helps to avoid information overload and allows the user to focus on the most relevant and important XR content.

By incorporating these technologies, the system can provide a significantly enhanced XR experience that is more intuitive, engaging, and personalized, thereby addressing the common pitfalls associated with traditional XR systems.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an XR content generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some examples, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
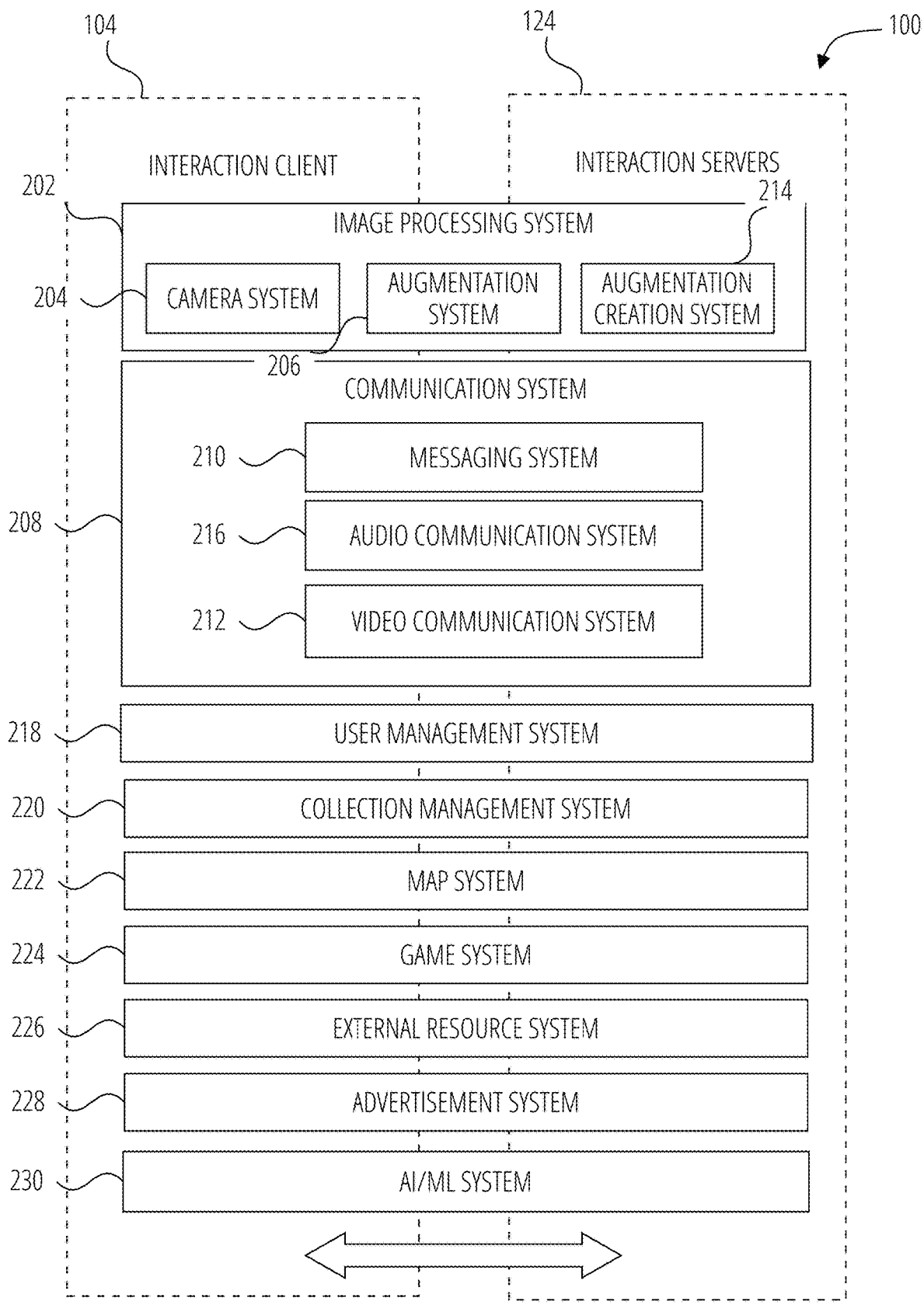
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
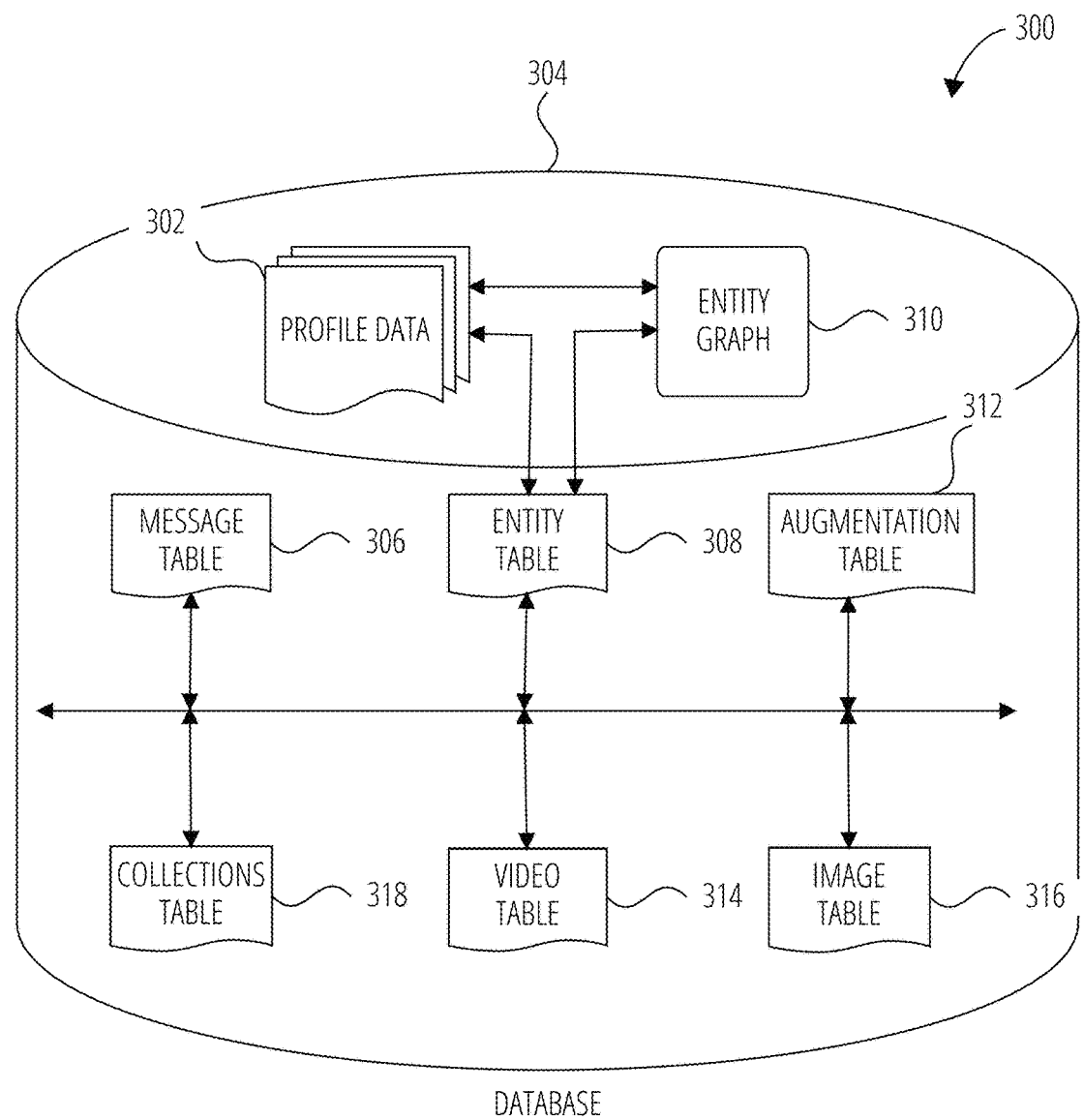
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Figure 4:
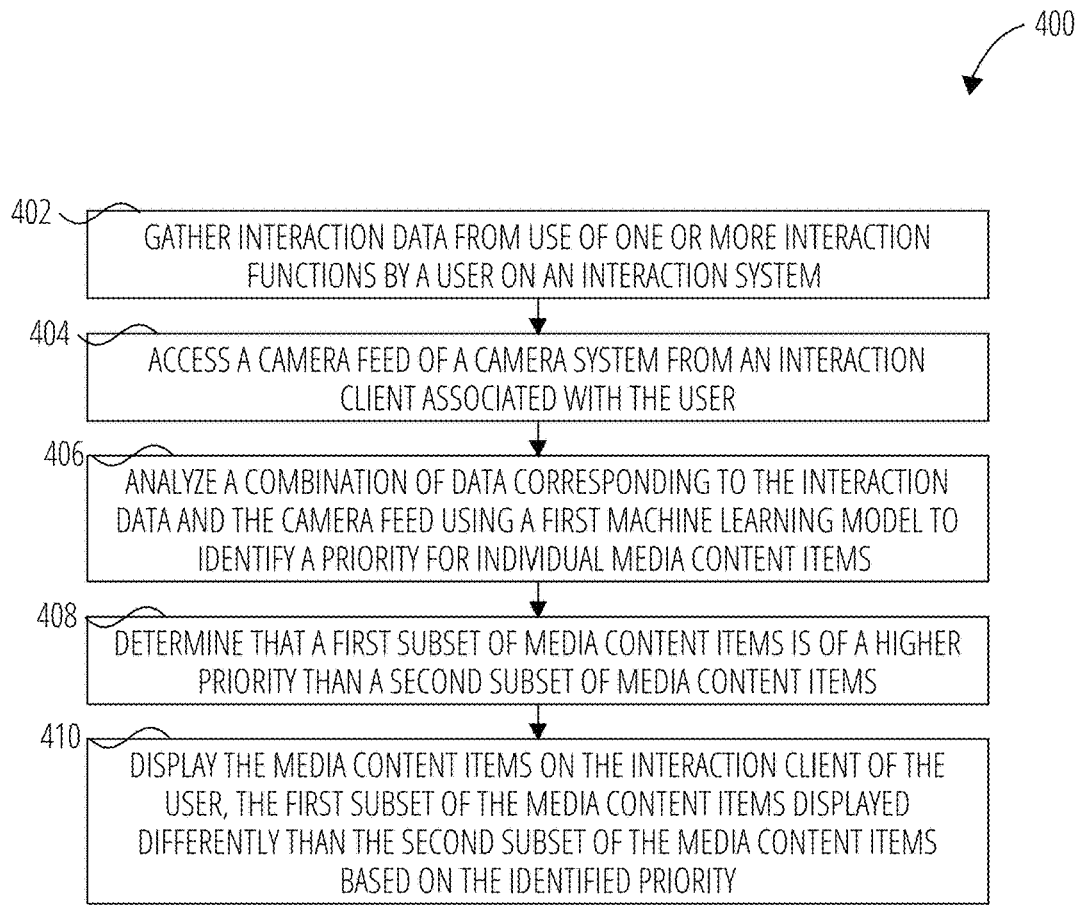
FIG. 4 illustrates a flowchart for displaying media content items differently based on an identified priority, according to some examples.

Highlighting or Annotating Media Content Items Based on Priority Using Machine Learning Models FIG. 4 illustrates a flowchart 400 for displaying media content items differently based on an identified priority, according to some examples. Although the example flowchart 400 depicts a particular sequence of operations, the sequence may be altered without departing from the scope of the present disclosure. For example, some of the operations depicted may be performed in parallel or in a different sequence that does not materially affect the function of the flowchart 400. In other examples, different components of an example device or system that implements the flowchart 400 may perform functions at substantially the same time or in a specific sequence.

FIG. 4 is described as being performed by certain systems or applying certain processes, such as a particular machine learning model or computer vision model, but the processes described herein can be performed by one or more other or the same machine learning models, computer vision models, or a combination thereof.

At operation 402, an interaction client 104 gathers interaction data from use of one or more interaction functions by a user on an interaction system 100. For example, a user can take images on a mobile phone, post such images on the interaction client 104 on the user's laptop for other users of the interaction system 100 to view, wear an Extended Reality (XR) device to work, and wear a wearable watch while exercising after work, and the interaction client 104 can gather data associated with these activities. User interaction data can include data from different formats (e.g., images, videos, camera feeds, exercise data).

Figure 5:
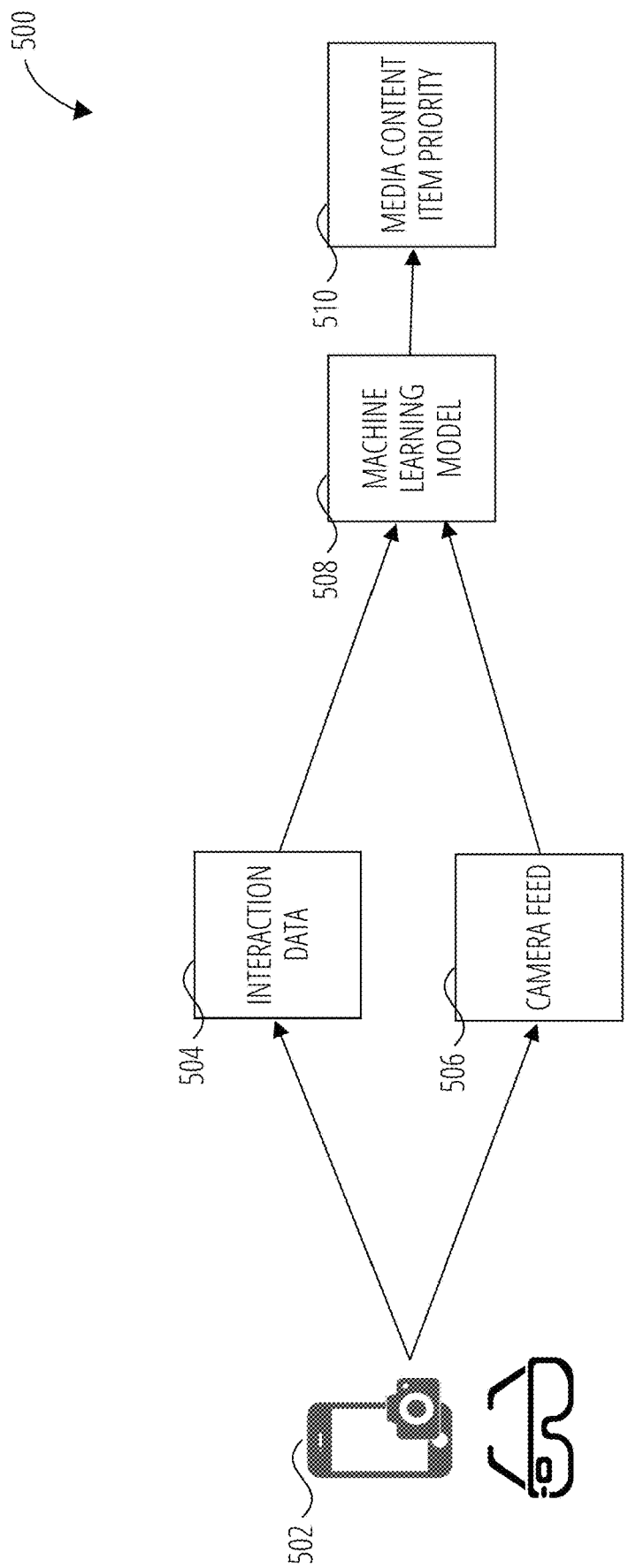
FIG. 5 illustrates an architecture for displaying media content items, according to some examples.

FIG. 5 illustrates an architecture 500 for displaying media content items, according to some examples. According to operation 402, the interaction client 104 of a user (such as a mobile phone or an XR device 502) gathers interaction data from use of one or more interaction functions by a user of an interaction system 100. For example, interaction data 504 of the user that includes data from multiple devices of a user over a period of time is accessed.

XR is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

Interaction functions include features users can access on the interaction system 100, such as camera feeds, chat windows, posting of videos or images, and/or the like (further described herein). Interaction data includes data corresponding to these functions, such as an image or video, sensor data, device configuration data, and/or the like.

Sensor data includes visual data, such as real-time images, videos, or camera feeds of the user's environment; depth sensor data that provide information about the distance of objects in the environment from a device; motion sensors (such as from a gyroscope, or accelerometer) that detect the orientation and movement of the device, Global Positioning Sensor (GPS) data that provide location data; magnetometer data used to detect the direction in which the device is pointing by detecting the Earth's magnetic field, and/or the like.

Sensor data includes light sensor data that measure the ambient light in the environment, proximity sensor data that detect the presence of nearby objects without any physical contact, audio sensors that capture sound data, touch sensor data that enable user interaction with the digital content, such as selecting options or moving objects, thermal sensor data that measure temperature, ultrasonic sensor data that measure the distance to an object by using sound waves, and/or the like.

Device configuration data includes device specification data with hardware and software specifications of the device such as processor type, memory capacity, battery status, an operating system version, and a software version; sensor configuration data that includes the calibration and sensitivity settings of the device's sensors; user preferences data that are adjustable by the user, such as language, brightness, volume, privacy settings, and the arrangement or selection of applications, and/or the like.

Device configuration data includes network configuration data related to WiFi, Bluetooth, cellular data connection, proxy settings, VPN configurations, and other network-related preferences; display configuration data including resolution, aspect ratio, brightness, contrast, color settings of the device's display, and the calibration of the visual overlay; interaction settings for gesture recognition, voice commands, haptic feedback, and other interaction modalities; location settings including permissions for location data use, and/or the like.

Device configuration data includes a current tint level. For example, the current tint level may be set to a darker level. The current time level is useful for identifying how the emphasis on higher priority media content items will be displayed, such as a brightness applied based on the current tint level or a reduction of brightness resulting in hiding or deemphasis of other non-prioritized digital elements.

At operation 404, the interaction client 104 receives a camera feed of a camera system associated with the user. The camera feed is received from an XR device that the user is currently wearing or from a camera system of a mobile phone. For example, a user can open a camera feed to take an image or apply a content augmentation to the camera feed. For example, the mobile device or the XR device 502 provides a real-time live camera feed 506, as shown in FIG. 5.

At operation 406, the interaction client 104 analyzes a combination of data corresponding to the interaction data and the camera feed using a first machine learning model to identify a priority for individual media content items. In some examples, the interaction client 104 inputs the interaction data and the camera feed into the first machine learning model. The first machine learning model is trained to identify a priority for individual media content items based on inputted interaction data and a camera feed (as described further herein). For example, the architecture 500 of FIG. 5 illustrates the application of the interaction data 504 and the camera feed 506 into the machine learning model 508.

In some examples, the media content items include:
Content augmentations to enhance images, videos, or other media content items to share with others, such as by adjusting the color or appearance or adding interactive elements such as animations and facial transformations, in real-time.
Emojis that are small images or icons that represent emotions, reactions, or objects.
Stickers that are larger images or animations that can be sent in a chat window.
Images or photographs that can be sent to other users to share visual information or document a particular event.
Video clips that can be used to share recorded content or document a particular event.
Audio messages that can be shared to communicate audible communication.
Graphics Interchange Formats (GIFs) that are short animations that can be used to add humor or express emotions.

The first machine learning model identifies priorities for media content items based on the interaction data and/or the camera feed. The first machine learning model prioritizes different media content items based on a range of factors that could be pertinent to the XR device and/or the user.

In some examples, the first machine learning model identifies priorities based on safety, such as potential hazards in the user's environment. For example, the first machine learning model detects a dangerous obstacle in the user's path identified in the live camera feed. The media content item for the obstacle is flagged as having a higher priority than other media content items.

In some examples, the first machine learning model identifies priorities based on user interest. Based on historical activity and interaction data, the first machine learning model learns to identify the types of content that the user is most interested in. For instance, if the user frequently interacts with certain types of XR games or frequently searches for specific types of information, the model prioritizes similar content.

In some examples, the first machine learning model identifies priorities based on contextual priorities. The first machine learning model analyzes the live camera feed and other sensor data to understand the user's current context and prioritizes content accordingly. For example, if the user is in a shopping mall, the XR device prioritizes retail-related content, like ads or discounts from nearby stores.

In some examples, the first machine learning model identifies priorities based on time-sensitive priorities, as some content might be time-sensitive. For instance, news alerts, reminders, or live events could be prioritized based on the current time or date, or current relevance to the user.

In some examples, the first machine learning model identifies priorities based on social interaction. If the XR device is used for social interactions, the first machine learning model prioritizes content related to the user's friends or social networks. For example, the first machine learning model highlights messages or updates from close friends or show augmented content related to trending topics among the user's social circle.

In some examples, the first machine learning model identifies priorities based on task information. If the user is performing a specific task, the first machine learning model prioritizes content related to that task. For example, if the user is cooking, the XR device prioritizes displaying a recipe or cooking instructions.

In some examples, the first machine learning model identifies priorities based on personalized learning. Based on a user's learning behavior or patterns, the first machine learning model prioritizes specific educational or informative content to enhance the user's learning experience.

In some examples, the first machine learning model identifies priorities based on health characteristics. If the XR device is being used for health-tracking features, the first machine learning model prioritizes health-related alerts, such as reminders to take a break, stand up, or perform some physical activity.

At operation 408, the interaction client 104 determines that a first subset of media content items is of a higher priority than a second subset of media content items. For example, if the user is cooking, the first machine learning model determines that media content items corresponding to a recipe or cooking instructions are of a higher priority than media content items related to news topics. As shown in FIG. 5, the machine learning model 508 outputs a media content item priority 510 for individual media content items, which can then be used to govern how the media content items are displayed to the user.

At operation 410, the interaction client 104 displays the media content items on the interaction client of the user. The first subset of the media content items is displayed differently than the second subset of the media content items based on the identified priority. Continuing the example of a user while cooking, the first subset of media content items corresponds to recipe or cooking instructions and these media content items are displayed first, in a different size, or with highlights as compared with the second subset of media content items corresponding to news topics.

In some examples, the first machine learning model is trained to identify a priority for individual media content items based on inputted interaction data and camera feeds. The interaction system 100 trains the first machine learning model by identifying historical interaction data of users, corresponding camera feeds, and expected priorities for sample media content items. The interaction system applies the historical interaction data and camera feeds to the first machine learning model to receive output priorities for individual media content items. The interaction system 100 then compares the output priorities with the expected priorities to determine a loss parameter for the first machine learning model. The interaction system 100 then updates a characteristic of the first machine learning model based on the loss parameter.

Systems and methods described herein include training a machine learning network, such as training to identify priorities for individual media content items. The machine learning network can be trained to assess interaction data of a user (such as historical interactions of a user with features of the interaction system 100) and a live camera feed to identify media content items that are relevant for the user. The machine learning model is trained to set higher priorities based on one or more relevant factors, such as an urgency, a current user context, or user historical preference (as further described herein). The machine learning algorithm can be trained using historical information that include historical interaction data among users, and resulting priorities for media content items.

Training of models, such as artificial intelligence models, is necessarily rooted in computer technology, and improves modeling technology by using training data to train such models and thereafter applying the models to new inputs to make inferences on the new inputs. Here, the new inputs can be interaction data of a current user and a live camera feed. The trained machine learning model can determine priorities for media content items to govern the display of the media content items to the user.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new interaction data) and make predictions that the model was trained for based on the weights or scores that were adjusted during training. Such training of the machine learning models described herein reduces false positives and increases the performance of identifying priorities.

In some examples, interaction functions include user interaction with a camera feed displayed on the user system 102, such as selecting a real-world object on a camera feed or selecting a digital item or overlay shown on the camera feed. In some examples, interaction functions also include a chat window where messages, stickers, emojis, and other media content items are shared between users via user systems 102.

Interaction functions further include sending photos or videos to friends, either individually or in groups, which are edited with text, stickers, filters, and drawings before being sent. Interaction functions include capturing a video or audio, inputting text, or other communications that disappear after certain conditions are met, such as being viewed once or setting a time limit, creating a more ephemeral and casual sharing experience.

In some examples, interaction functions include generating or viewing a collection of videos, messages, stickers, or other media content items that are visible to friends for a certain period of hours (e.g., 24 hours). Interaction functions include displaying media content items from other users, such as publishers, creators, and influencers, where users explore and subscribe to different channels to receive updates on their favorite content. Interaction functions include map and location functions, such as users sharing their location with friends and viewing their friends' locations on a map, or exploring a map with points of interest by other users categorized by location and events.

In some examples, interaction functions include generating or applying various filters and content augmentations to enhance images, videos, or other media content items to share with others, such as by adjusting the color or appearance or adding interactive elements such as animations and facial transformations, in real-time. Interaction functions include saving favorite media content items with other users in a private archive, where users access these saved media content items later, edit them, or share them with friends.

Interaction functions include personalizing or applying avatars which are used as a profile picture to be viewed by others and in stickers, chat, and image/video decorations. Interaction functions include playing multiplayer games that users play with their friends directly within the user interface of the system to share messages and media content items.

Interaction functions include capturing data by an Augmented Reality (AR) device. In some examples, the interaction system 100 captures motion and position data, such as data from accelerometers, gyroscopes, and magnetometers to track user movement or orientation. In some examples, the interaction system 100 captures eye-tracking data which monitors the user's eye movements and focus, gaze-based interactions, objects the user is focused (or not focused) on, or user attention patterns.

In some examples, the interaction system 100 captures facial expressions. In some examples, the interaction system 100 captures biometric data, such as heart rate, body temperature, or skin conductivity. In some examples, the interaction system 100 captures data related to user interactions within the virtual or augmented environment, such as objects or buttons users interact with, the time spent in specific areas, or the choices users make. In some examples, the interaction system 100 captures voice data, voice recognition, voice commands, and/or the like. In some examples, the interaction system 100 captures location data, such as a user's GPS location. In some examples, the interaction system 100 captures usage data related to how and when the devices are used, session duration, frequency of use, and user engagement with specific content or applications.

In some examples, the interaction data includes data in different modalities. For example, the user interaction data includes text data from a post for other users to see, a recorded video from a mobile phone, audio commands entered into an XR device, GPS location data, and/or the like. The interaction client 104 processes such data through a machine learning model trained to generate features in the latent space. Once each of the interaction data in different modalities are analyzed by the machine learning model and converted to latent space features, such features are able to be compared and used by the interaction system now that the features are in the same format. Such standardization of formatting of data in different modalities enables the interaction client 104 to be able to apply a far more diverse range of data in order to assess the intent of the user.

Applying Computer Vision Models and Machine Learning Models

Figure 6:
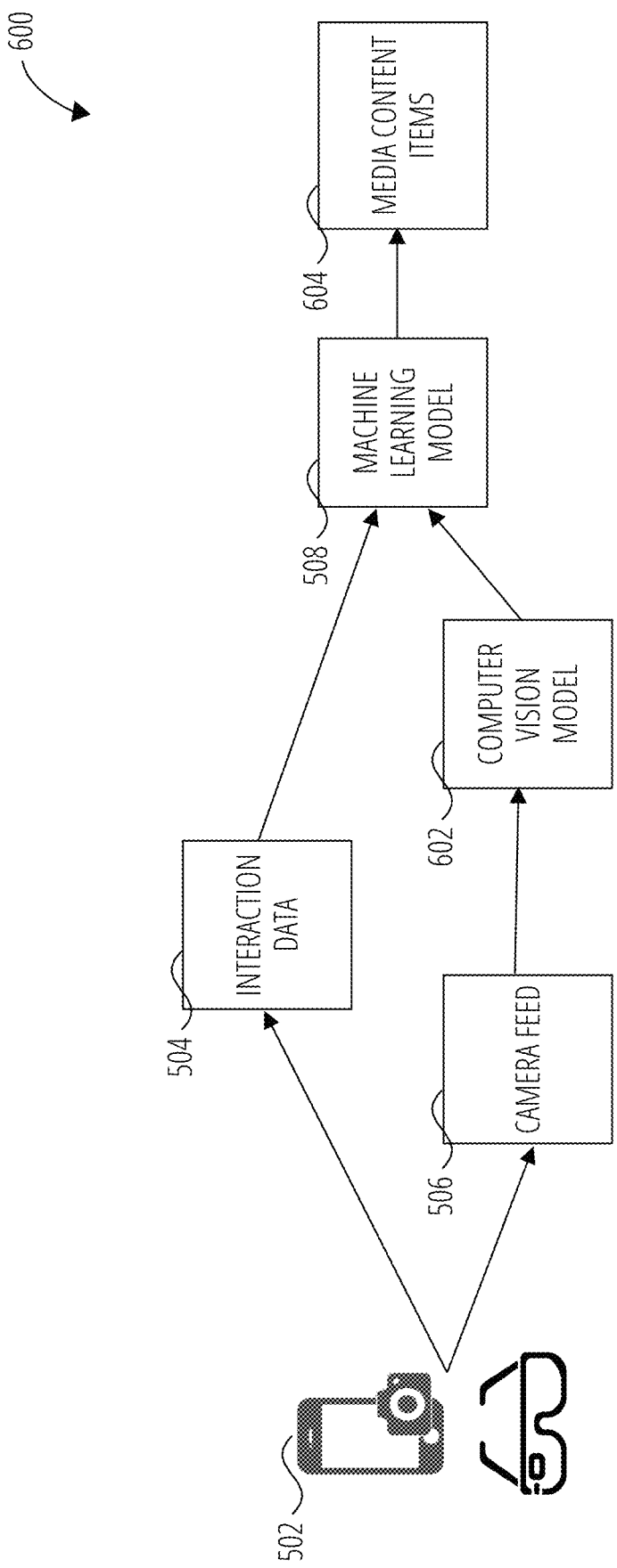
FIG. 6 illustrates an architecture of applying computer vision models to identify objects in order to input into a machine learning model for priority determination of media content items, according to some examples.

FIG. 6 illustrates an architecture 600 of applying computer vision models to identify objects in order to input into a machine learning model for priority determination of media content items, according to some examples.

Similar to FIG. 5, the architecture 600 of FIG. 6 includes the mobile device or XR device 502 providing interaction data 504 and the camera feed 506, and the machine learning model 508. In the architecture 600, the camera feed is inputted into a computer vision model 602 to identify environmental characteristics. The camera feed includes one or more objects displayed in the camera feed and the environmental characteristics include the identification of the one or more objects.

Environmental characteristics include objects identified by object recognition. The model identifies objects in the camera's field of view, such as cars, people, buildings, animals, and/or the like. Beyond recognizing individual objects, the model identifies the overall scene, such as whether the user is in a park, at home, in an office, etc.

In some examples, the model identifies individual people. The model identifies particular individuals or categories of individuals based on their facial features. The model analyzes facial expressions, and the model can infer the user's emotional state.

In some examples, the model analyzes movement of objects and people in the video feed. The model then infers what activity is taking place. The model recognizes hand or body gestures, which can be used as a form of interaction with the XR device.

In some examples, the model estimates the depth of various objects in the scene, which provides a three-dimensional understanding of the environment. The model identifies and interprets text within the camera's field of view.

In some examples, the model assesses the lighting conditions based on the camera feed. The model also classifies each pixel in an image to understand the composition and context of the scene, such as distinguishing between different objects, backgrounds, and identify road, sky, buildings, etc.

The computer vision model identifying objects within an image or a video stream via feature extraction, such as by applying deep learning-based models like Convolutional Neural Networks (CNNs), which are capable of automatically learning the best features for a given task during the training process. In some examples, the computer vision model applies a sliding window that slides over the entire image and each window's content is classified as containing the object or not. In other cases, Region-based CNN (R-CNN) are used to generate a small set of potential bounding boxes that might contain objects (region proposals) and then classify each one.

The environmental characteristics (such as the identified objects) and/or the interaction data 504 are analyzed by the first machine learning model. The first machine learning model outputs priorities for individual media content items.

In some examples, the machine learning model generates instructions and/or user interface data for the media content items. For example, the machine learning model indicates that a first subset of media content items has a higher priority than a second subset and generates user interface data to display the first subset differently than the second subset. The first subset can be displayed differently than the second subset, such as using annotation, highlighting, and/or the like (described further herein).

In some examples, the machine learning model generates the media content items 604 themselves. For example, the machine learning model identifies a first subset of media content items that are relevant for the current context for the user and generates such media content items for display.

FIG. 7 illustrates text 700 whereby subsets of media content items of text are displayed differently, according to some examples. Characters, words, phrases, sentences, and/ or the like are divided into different subsets. The machine learning model outputs first subset 702 of text as lowest priority, the second subset 704 of text as middle priority, and the third subset 706 as highest priority.

The third subset 706 is annotated with notes on the side to indicate the highest priority and with explanatory text. The second subset 704 is highlighted to guide the user to focus on such text. The first subset 702 is displayed normally. In some examples, the media content item (such as text) of higher or lower priority can be displayed differently, such as being displayed as highlighted, annotated, increased in displayed size, hidden, and/or the like (as further described herein).

Figure 8:
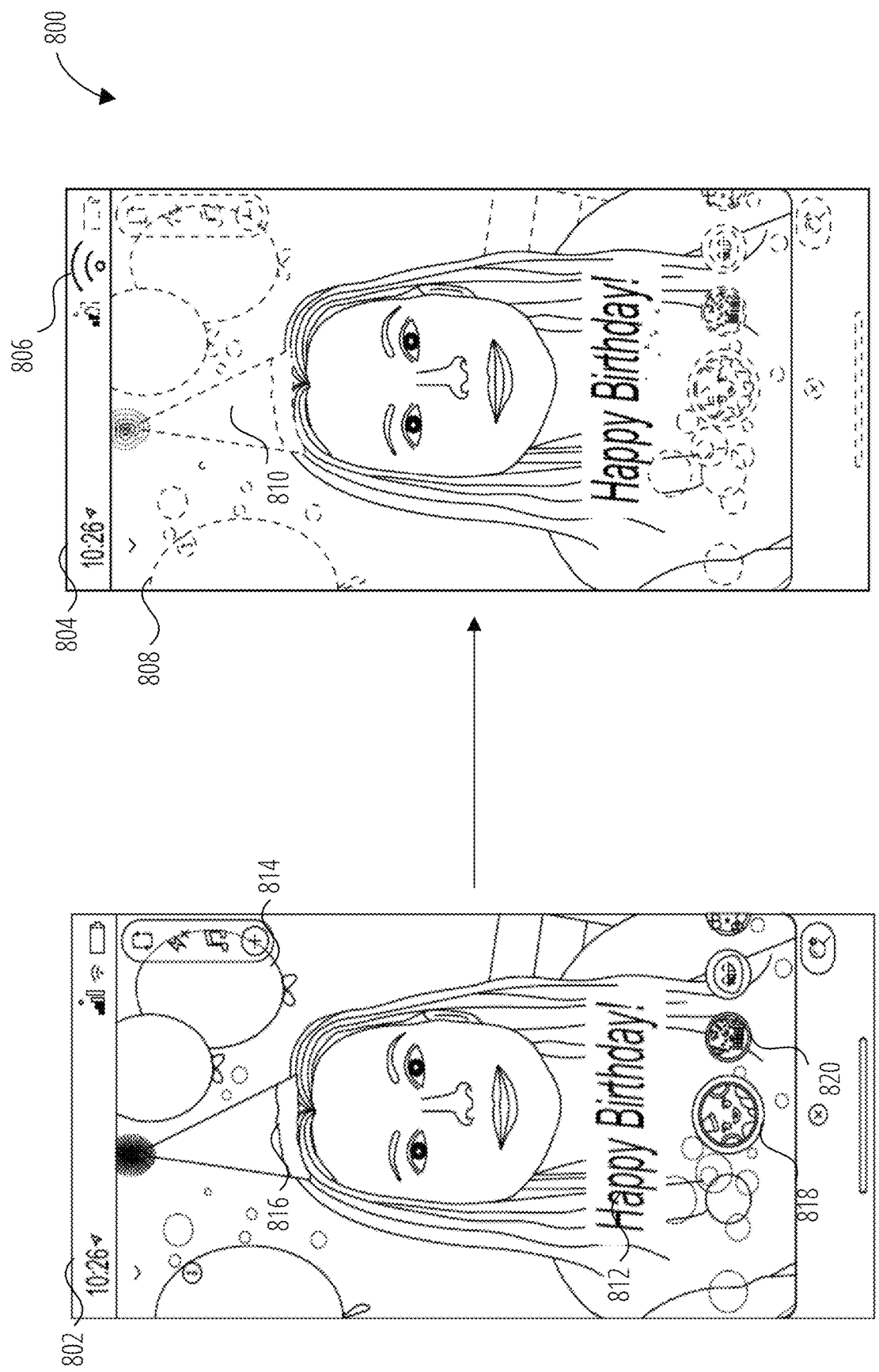
FIG. 8 illustrates content augmentation generation and changing of user interface to emphasize the internet connection icon, according to some examples.

FIG. 8 illustrates content augmentation generation and changing of user interface 800 to emphasize the internet connection icon, such as the Wifi media content item 806, according to some examples. In some examples, the interaction client 104 applies the first machine learning model to generate media content items along with corresponding priorities.

In some examples, the first machine learning model generates recommended content augmentations based on the user interaction data and the camera feed. The content augmentation augments, modifies, or overlays content from a camera feed of a camera system with one or more digital elements. Digital elements include at least one of: an image, an animation, or audio.

In the example of FIG. 8, a "happy birthday" content augmentation is applied to the camera feed in user interface 802, whereby digital elements, such as a "happy birthday" text 812, balloons 814, and a birthday hat 816, are added to the camera feed. In some examples, a second machine learning model and/or the first machine learning model generates content augmentations based on the camera feed and the interaction data. For example, the second machine learning model identifies from the interaction data that the user is at a birthday party of a friend (based on happy birthday postings of other users in the same GPS area as the current user, based on calendar and location information, based on profile data of the friend, based on facial recognition of the friend, and so forth).

The second machine learning model generates a plurality of content augmentations based on the priorities identified by the first machine learning model. Such content augmentations can include a first content augmentation 818 of a "happy birthday" and a second content augmentation 820 with a birthday cake.

In response to a user selection of the first selectable user interface element, such as an icon for the content augmentation 818, the interaction client applies the first content augmentation to the camera feed from a camera system of the interaction system. The first content augmentation augments, modifies, and/or overlays content on a camera feed of a camera system with one or more digital elements. The digital elements include at least one of: an image, an animation, or audio.

The interaction client 104 displays a second selectable user interface element, whereby in response to a user selection of the second selectable user interface element, the interaction client 104 captures a picture or video of the camera feed with the applied first content augmentation.

The interaction client 104 continues to apply the camera feed and interaction data into the first machine learning model. Later, the interaction client 104 gets disconnected from the internet connection (such as the Wifi connection). The first machine learning model changes the priority of media content items to place higher priority onto the Wifi media content item 806. As such, the interaction client 104 changes the user interface 804 to highlight the Wifi media content item 806 over other media content items.

For example, the Wifi media content item 806 is displayed to be larger than the original icon in user interface 802, and the other digital elements, such as the balloons 808 and the birthday hat 810, are hidden from the camera feed.

Highlighting Physical Danger

Figure 9:
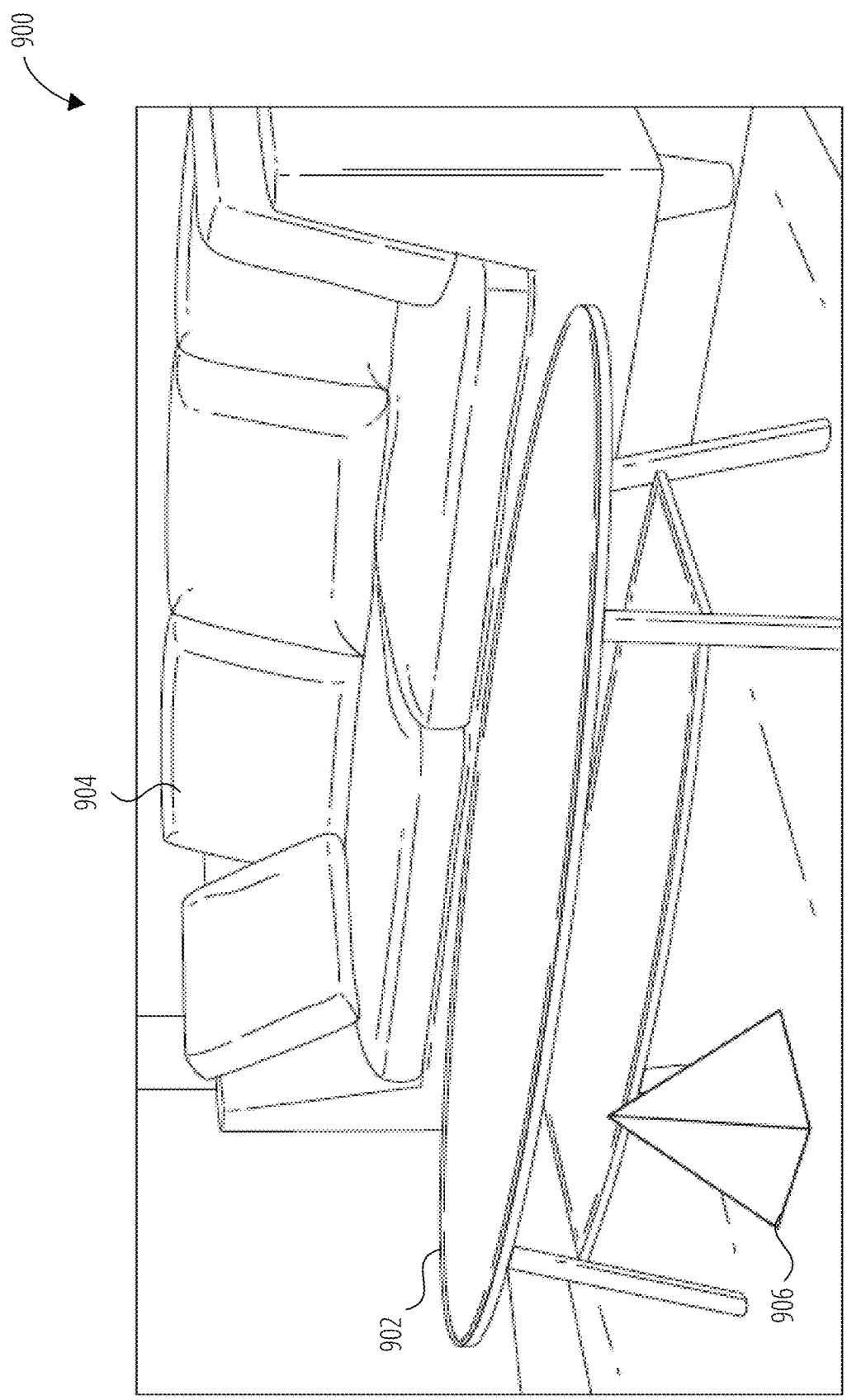
FIG. 9 illustrates a media content item with high priority based on a physical hazard, according to some examples.

FIG. 9 illustrates a media content item with high priority based on a physical hazard 900, according to some examples. In some examples, the first machine learning model generates priority for media content items based on a physical hazard for the user. For example, the camera feed with a coffee table 902, a sofa 904, and a sharp object 906.

The first machine learning model and/or the computer vision model identifies that a sharp object 906 is in close proximity of the user. The first machine learning model sets the media content item corresponding to the sharp object 906 as high. The interaction client 104 then displays a media content item corresponding to the sharp object 906 in the user interface.

The first machine learning model identifies a context such that the recognition of dangerous objects is custom tailored to a user. The machine learning model can identify dangerous objects based on characteristics of the objects themselves, such as the sharpness or proximity of the object. The machine learning model can identify dangerous objects based on user information, such as an age of the user (certain objects can be more dangerous to an infant, youth, or senior citizen than young adults) or a user's medical condition (such as unsteady footing due to gait). The first machine learning model takes into account the occupation of the user. A construction worker, for instance, could be around many sharp or potentially dangerous objects (nails, power tools, etc.) that wouldn't pose the same threat to someone trained to handle them.

Specific health-related information like visual acuity, motor control, and cognitive impairment helps the machine learning system to understand the risk level associated with different objects. The machine learning model considers a user's hobbies and interests. For example, if the user is a professional chef or a woodworking enthusiast, then the model considers a kitchen knife or a woodworking tool as less threatening.

The machine learning model considers user's physical attributes, such as a user's height, physical strength, and agility which can play a role in how threatening an object might be. Whether the user lives alone or with others, the presence of children or pets, etc., could all affect the risk associated with various objects. The model considers a user's experience and training, such as military training, experience with handling tools, first aid training, etc.

The machine learning model uses the geographical information to understand the context of the user better. Some objects might be riskier in certain environments (like an open knife on a boat vs in a kitchen). Patterns can emerge over time that help the model understand when an object poses a risk. For example, if the user often leaves the stove on unattended, the system might identify the stove as a higher-risk object even when it's off. Over time, the model learns that the user tends to handle certain objects clumsily or irresponsibly, increasing their risk factor. The machine learning model uses medical history, such as data related to a history of depression or other mental health conditions to assess the risk level of certain objects. The model uses emergency records, such as prior instances of accidents or emergency situations involving certain objects that is used to help identify future risks.

In some examples, the media content item corresponding to the sharp object 906 is displayed without rendering the media content items associated with the coffee table 902 or the sofa 904. In response to a lapse of a time period or a user interaction of the media content corresponding to the sharp object 906, the interaction client 104 displays the other media content items.

In some examples, the XR device emphasizes higher priority media content items in different ways. The XR device decreases or increases a size of a media content item. The XR device displays higher priority content in a larger size or a more central position on the screen. The XR device uses colors, borders, or other visual effects to highlight high-priority content. For example, the XR device displays higher priority content in red, and other media content items in non-red color.

In a list or sequence of content, the XR device displays high-priority items first. The XR device uses animations to draw attention to important content.

In addition to visual cues, the XR device uses auditory or tactile cues to emphasize high-priority content. In some examples, high-priority content is displayed persistently, meaning the media content item stays on the screen even as the user interacts with other content or moves around in the environment.

In some examples, the XR device interrupts the current display to show high-priority content. For XR devices that understand the 3D space of the environment, high-priority content is anchored to a specific location in the real world, such as on a specific location or object.

Adding Prompt to Machine Learning Model

Figure 10:
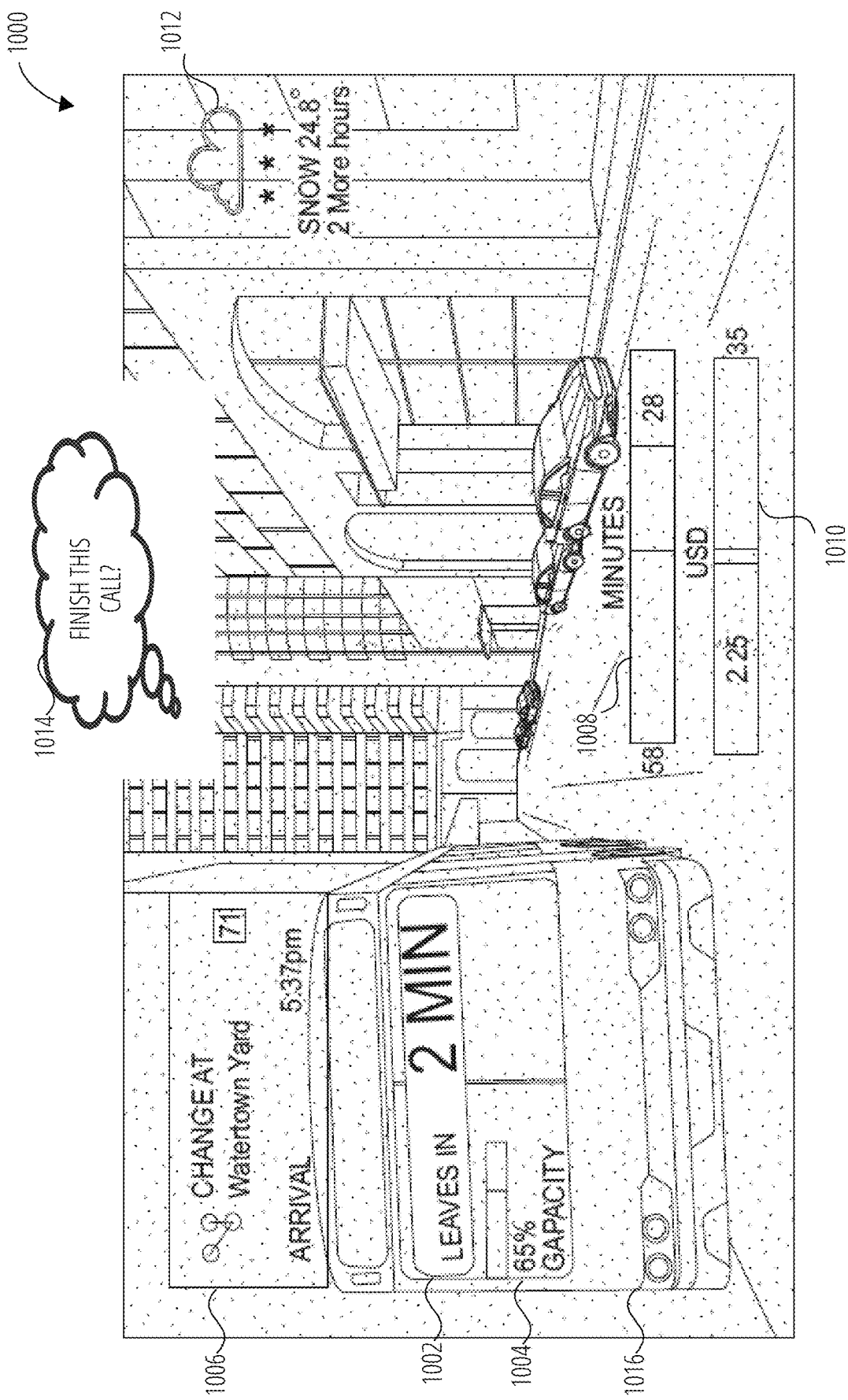
FIG. 10 illustrates an augmented reality user interface whereby a prompt is applied to a machine learning model, according to some examples.

FIG. 10 illustrates an augmented reality user interface 1000 whereby a prompt is applied to a machine learning model, according to some examples. In the example of FIG. 10, a user is standing by a bus stop where a bus 1016 has already arrived. The XR device displays various media content items, such as a 65% capacity 1004 for the bus 1016, location and estimated time of arrival at the destination 1006 associated with the user, cost in U.S. Dollars 1010, the number of minutes remaining 1008, amount of time before the bus leaves 1002, and weather data 1012.

In some examples, the interaction client 104 receives a prompt 1014 from a user, such as via voice or text. In other cases, the interaction client 104 infers a prompt for the user based on other data, such as objects detected in a camera feed or interaction data of the user. Yet in other cases, the interaction client 104 receives a prompt directly from a user and modifies the prompt based on the other data.

The interaction client 104 generates a prompt for the user based on the interaction data, the prompt corresponding to an intent of the user. The interaction client 104 analyzes a combination of data corresponding to the interaction data, the camera feed, and the prompt using the first machine learning model to identify priorities for media content items.

In the example of FIG. 10, the first machine learning model identifies that the user is currently on a phone call and identifies that the user is planning on heading to a certain location by bus based on contextual information such as time of day (after work), previous bus trips, calendar information, and so forth. Thus, the generated prompt is whether the user can finish his call before the bus 1016 leaves the bus stop. The media content item corresponding to the amount of time before the bus leaves 1002 is set to the highest priority and is emphasized by highlighting or brightness on the XR device display.

In some examples, a first subset of media content items (such as the amount of time before the bus leaves 1002) is displayed in one color and subsequently, a second subset (such as the 65% capacity 1004) is displayed in another color. In some examples, the XR device displays color one at a time. As such, a first color (such as red) is used for higher priority, a second color (such as blue) is used for the next highest priority, and so forth. As such, a user may not be able to recognize the fast use of such colors. However biologically, a user may be inclined to view the media content item in the first color before the other colors are rendered on the AR device.

Identifying the prompt for the first user includes receiving a question or request from the first user via text or speech. The interaction client 104 identifies keywords from the prompt and applies weights to each of the identified keywords. The interaction client 104 applies the identified keywords and corresponding weights to a second machine learning model to generate a new prompt or modify an existing prompt.

In some examples, the interaction client 104 generates the prompt for the user automatically based on an intent identified from real-time interaction data captured by the interaction client. The interaction client 104 generates prompts for a user based on a user's past activity, interests, and behavior patterns. The interaction client 104 generates personalized prompts related to topics the user may find appealing, such as if a user frequently interacts with a certain type of content about technology.

In some examples, the interaction client 104 uses popular or trending topics from the platform or the wider internet to create prompts that are likely to be of interest to a broad audience. In some examples, by utilizing a user's geographic location, the interaction client 104 can generate prompts that are relevant to their local area, such as events, news, or cultural topics. In some examples, the interaction client 104 can create prompts based on the time of day, season, or upcoming events or holidays, such as events that are time sensitive. In some examples, the interaction client 104 can use the user's social connections to generate prompts related to their friends, family, or other users they follow, such as a birthday or new connection with another user. In some examples, based on the user's activity within a specific application or AR experience, the interaction client 104 can generate prompts related to that context.

In some examples, the interaction client 104 can use the user's in-application actions, such as likes, comments, and shares, to generate prompts related to their interests. For example, if a user frequently interacts with content about cooking in a recipe application, the interaction client 104 may generate a prompt for the user's favorite dish to prepare at home. In some examples, by utilizing sensors and data from the user's mobile device or AR headset, the interaction client 104 creates context-aware prompts based on their physical environment. In some examples, the interaction client 104 can generate prompts based on real-time events occurring within the application or AR experience, such as a live-streamed event. In some examples, the real-time interaction data includes a current camera feed from a camera system of the first interaction client 104.

In some examples, the interaction client 104 uses the user's past activity, preferences, and behavior patterns within the application or AR experience to generate a prompt for the user. In some examples, the interaction client 104 gathers user profile information, such as a calendar of appointments or objects detected in a camera feed of an AR device to generate a prompt. In some examples, by incorporating gamification elements, the interaction client 104 creates prompts that encourage user participation and engagement, such as checking on a feature within a game.

Data Communications Architecture

Figure 11:
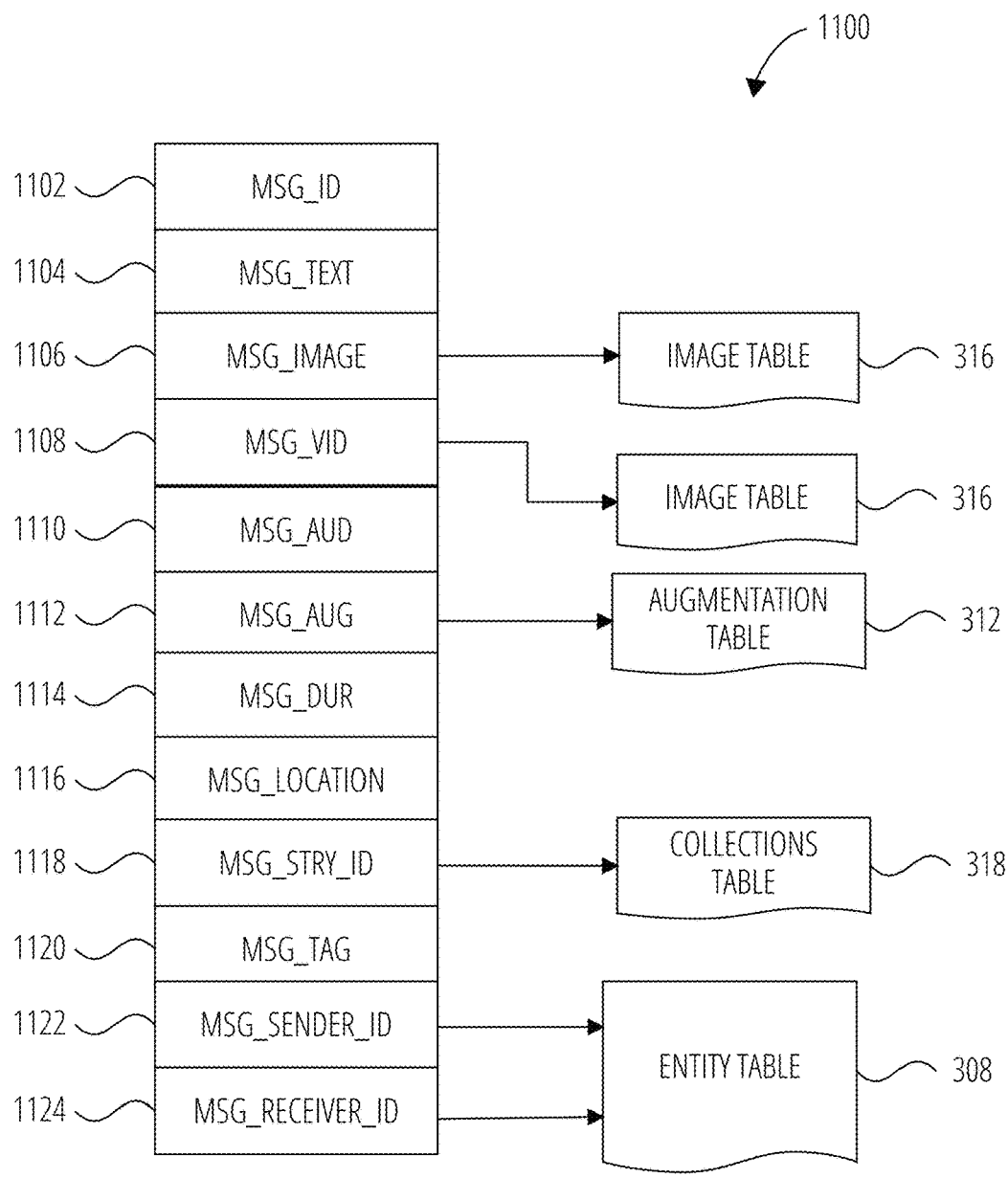
FIG. 11 is a diagrammatic representation of a message, according to some examples.

FIG. 11 is a schematic diagram illustrating a structure of a message 1100, according to some examples, generated by an interaction client 104 for communication to a further interaction client 104 via the interaction servers 124. The content of a particular message 1100 is used to populate the message table 306 stored within the database 304, accessible by the interaction servers 124. Similarly, the content of a message 1100 is stored in memory as "in-transit" or "in-flight" data of the user system 102 or the interaction servers 124. A message 1100 is shown to include the following example components:

Message identifier 1102: a unique identifier that identifies the message 1100.

Message text payload 1104: text, to be generated by a user via a user interface of the user system 102, and that is included in the message 1100.

Message image payload 1106: image data, captured by a camera component of a user system 102 or retrieved from a memory component of a user system 102, and that is included in the message 1100. Image data for a sent or received message 1100 may be stored in the image table 316.

Message video payload 1108: video data, captured by a camera component or retrieved from a memory component of the user system 102, and that is included in the message 1100. Video data for a sent or received message 1100 may be stored in the image table 316.

Message audio payload 1110: audio data, captured by a microphone or retrieved from a memory component of the user system 102, and that is included in the message 1100.

Message augmentation data 1112: augmentation data (e.g., filters, stickers, or other annotations or enhancements) that represents augmentations to be applied to message image payload 1106, message video payload 1108, or message audio payload 1110 of the message 1100. Augmentation data for a sent or received message 1100 may be stored in the augmentation table 312.

Message duration parameter 1114: parameter value indicating, in seconds, the amount of time for which content of the message (e.g., the message image payload 1106, message video payload 1108, message audio payload 1110) is to be presented or made accessible to a user via the interaction client 104.

Message geolocation parameter 1116: geolocation data (e.g., latitudinal and longitudinal coordinates) associated with the content payload of the message. Multiple message geolocation parameter 1116 values may be included in the payload, each of these parameter values being associated with respect to content items included in the content (e.g., a specific image within the message image payload 1106, or a specific video in the message video payload 1108).

Message story identifier 1118: identifier values identifying one or more content collections (e.g., "stories" identified in the collections table 318) with which a particular content item in the message image payload 1106 of the message 1100 is associated. For example, multiple images within the message image payload 1106 may each be associated with multiple content collections using identifier values.

Message tag 1120: each message 1100 may be tagged with multiple tags, each of which is indicative of the subject matter of content included in the message payload. For example, where a particular image included in the message image payload 1106 depicts an animal (e.g., a lion), a tag value may be included within the message tag 1120 that is indicative of the relevant animal. Tag values may be generated manually, based on user input, or may be automatically generated using, for example, image recognition.

Message sender identifier 1122: an identifier (e.g., a messaging system identifier, email address, or device identifier) indicative of a user of the user system 102 on which the message 1100 was generated and from which the message 1100 was sent.

Message receiver identifier 1124: an identifier (e.g., a messaging system identifier, email address, or device identifier) indicative of a user of the user system 102 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 316. Similarly, values within the message video payload 1108 may point to data stored within an image or video table 316, values stored within the message augmentation data 1112 may point to data stored in an augmentation table 312, values stored within the message story identifier 1118 may point to data stored in a collections table 318, and values stored within the message sender identifier 1122 and the message receiver identifier 1124 may point to user records stored within an entity table 308.

System with Head-Wearable Apparatus

Figure 12:
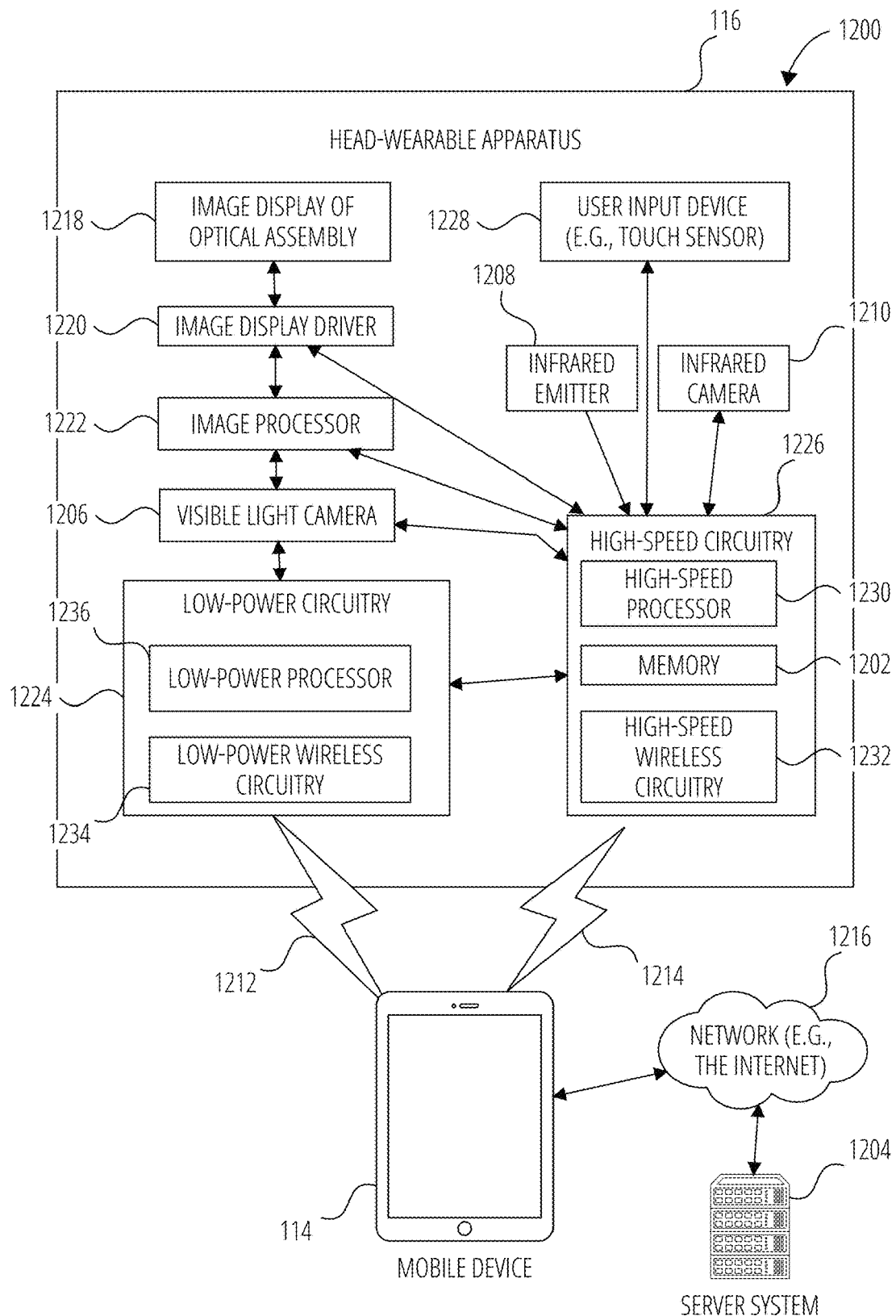
FIG. 12 illustrates a system including a head-wearable apparatus with a selector input device, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108. The networks 108 may include any combination of wired and wireless connections.

The head-wearable apparatus 116 includes one or more cameras, each of which may be, for example, a visible light camera 1206, an infrared emitter 1208, and an infrared camera 1210.

An interaction client, such as a mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WIFI®. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WIFI®). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
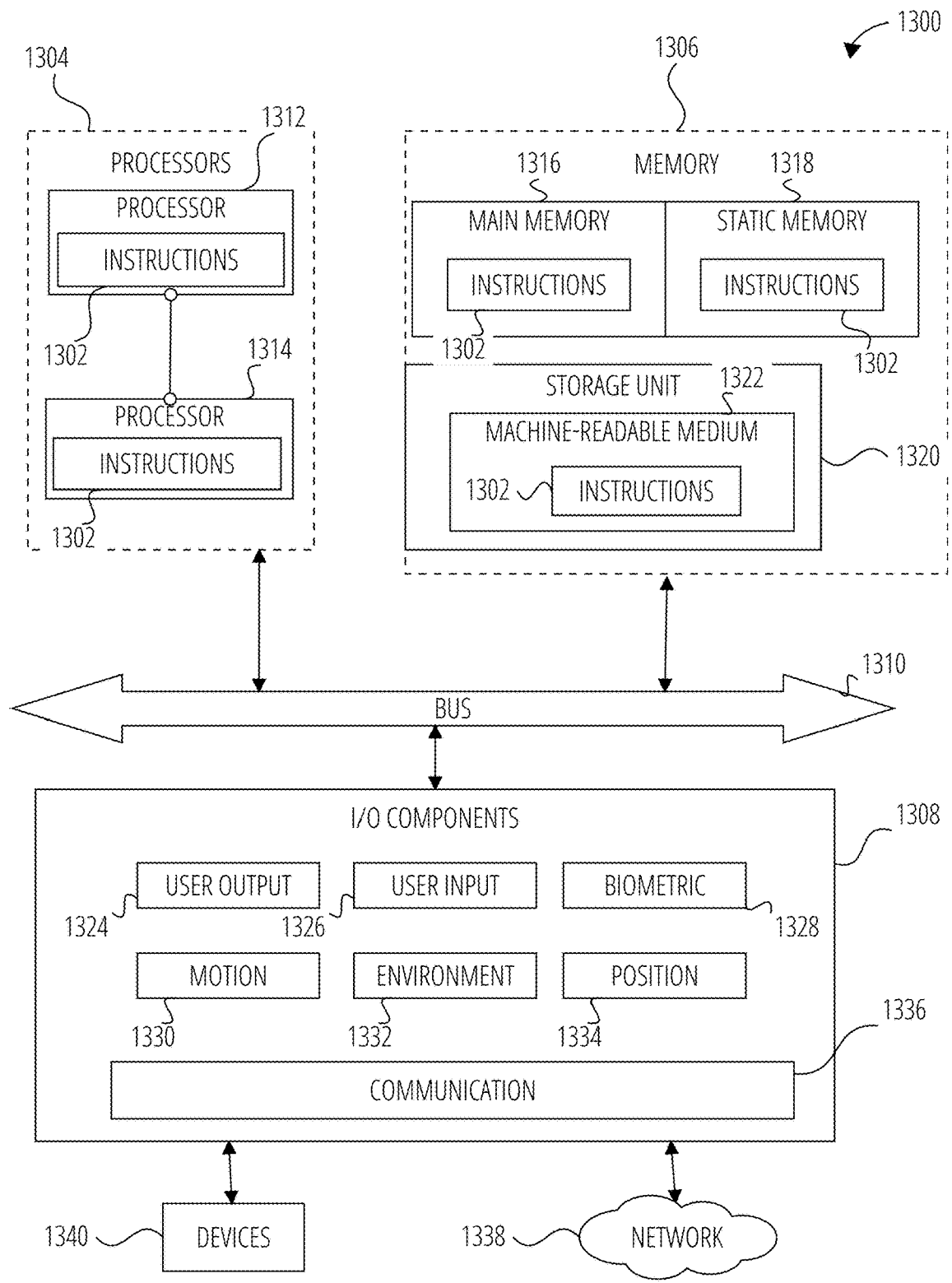
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1330 include acceleration sensor components (e.g., accelerometer), gravitation sensor components, rotation sensor components (e.g., gyroscope).

The environmental components 1332 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via WiFi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
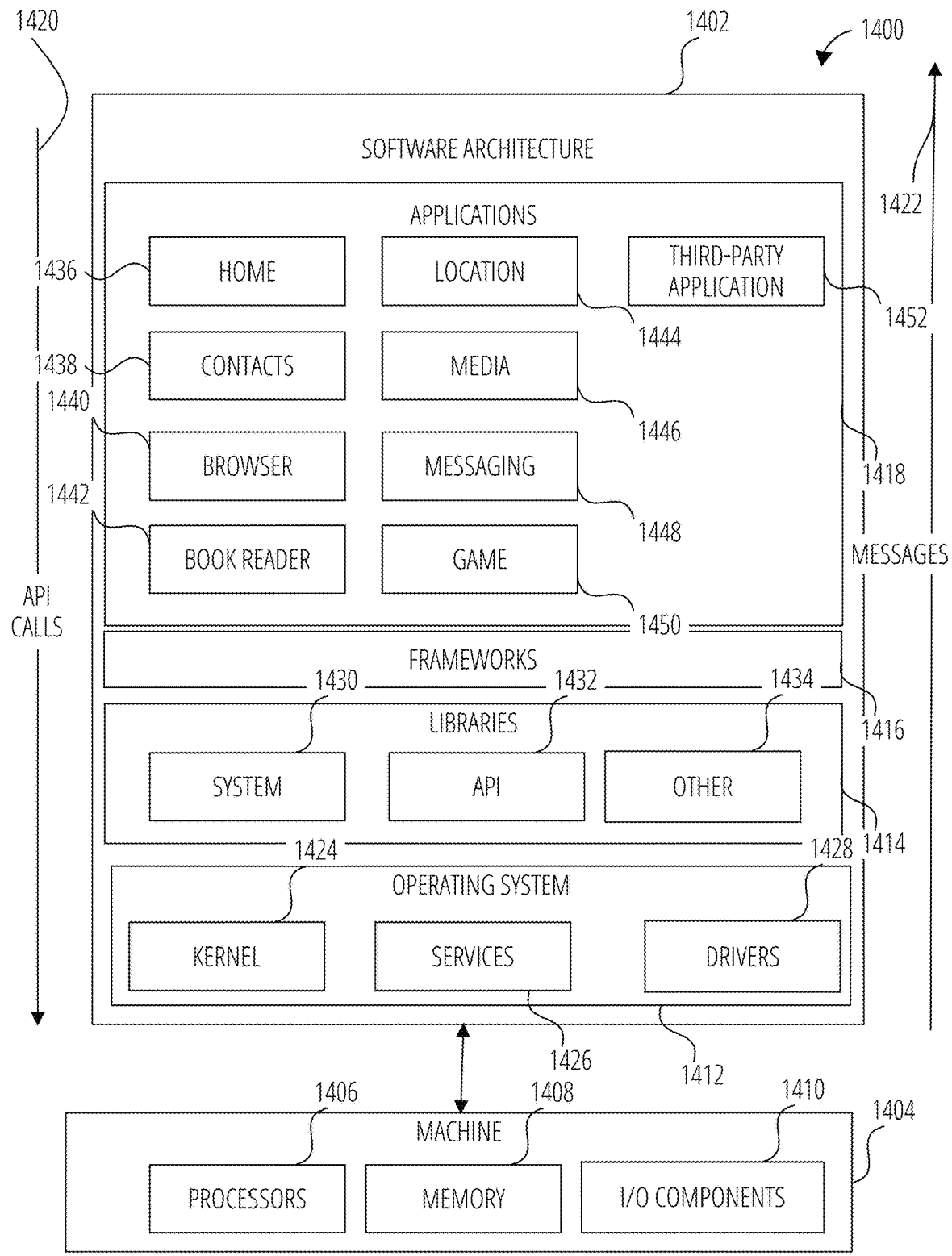
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WIFI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

Machine-Learning Pipeline

Figure 16:
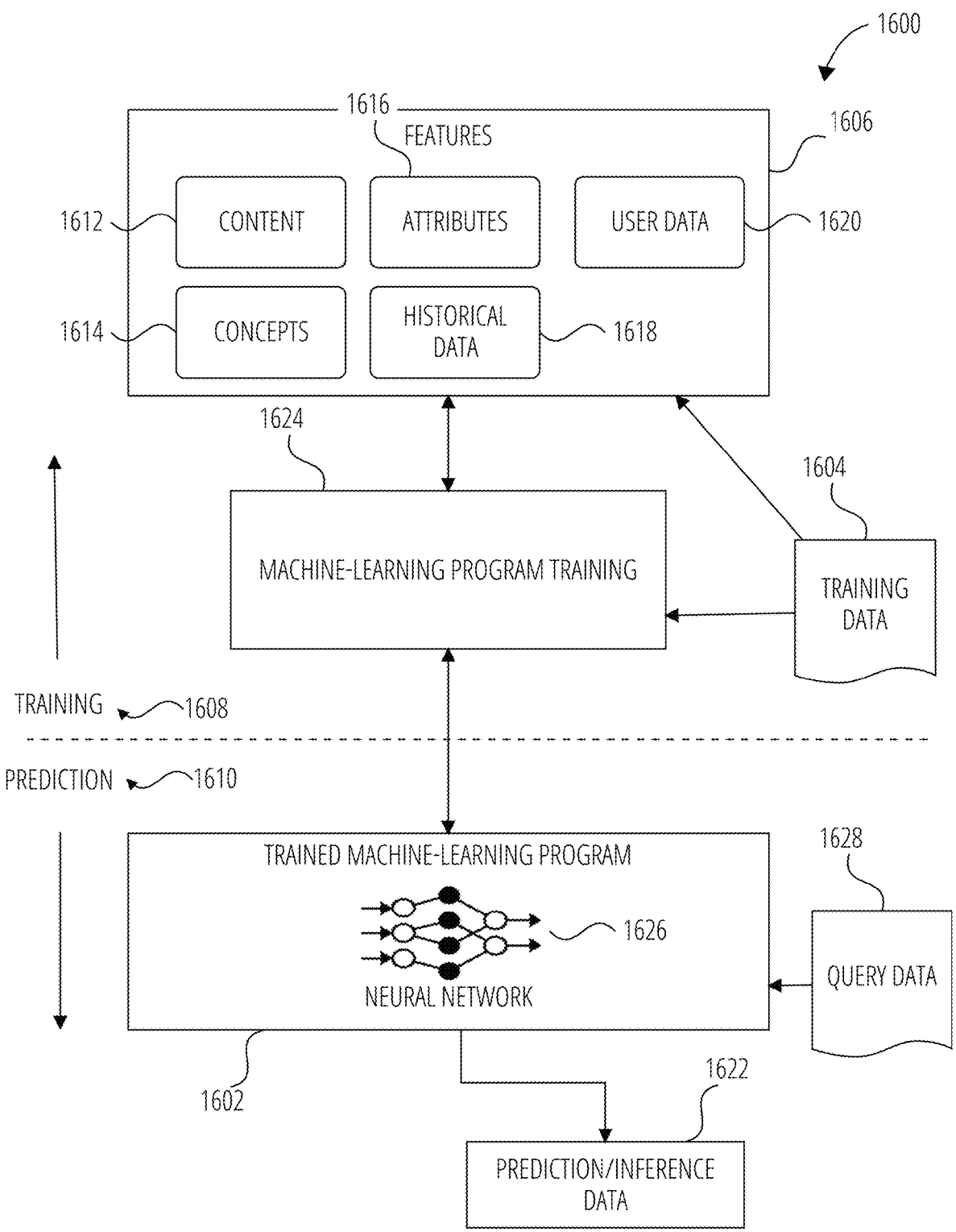
FIG. 16 illustrates training and use of a machine-learning program, according to some examples.

FIG. 16 is a flowchart depicting a machine-learning pipeline 1600, according to some examples. The machine-learning pipelines 1600 may be used to generate a trained model, for example the trained machine-learning program 1602 of FIG. 16, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 15:
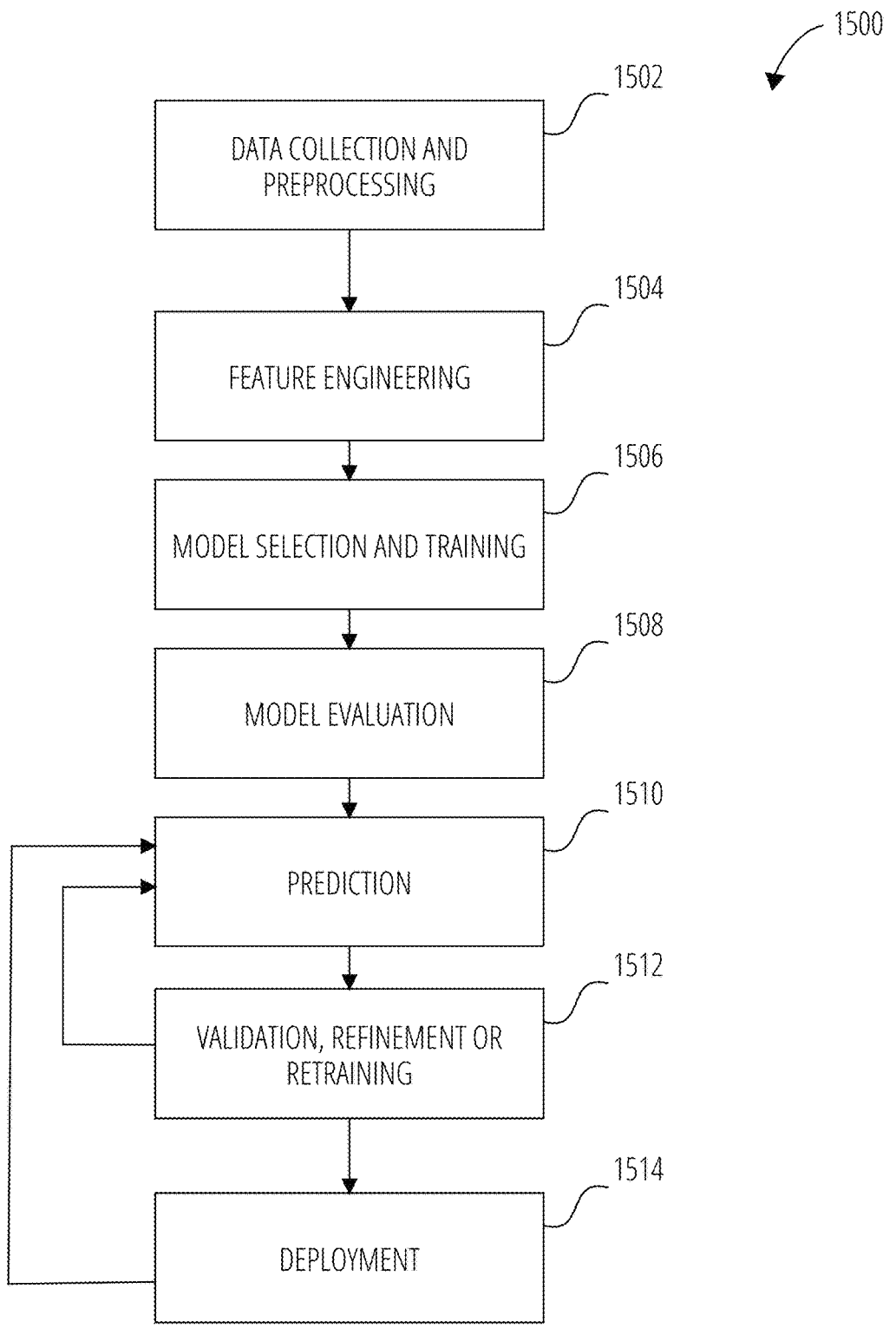
FIG. 15 illustrates a machine-learning pipeline, according to some examples.

Generating a trained machine-learning program 1602 may include multiple types of phases that form part of the machine-learning pipeline 1600, including for example the following phases 1500 illustrated in FIG. 15:

- Data collection and preprocessing 1502: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1504: This may include selecting and transforming the training data 1604 to create features that are useful for predicting the target variable. Feature engineering may include (1) receiving features 1606 (e.g., as structured or labeled data in supervised learning) and/or (2) identifying features 1606 (e.g., unstructured or unlabeled data for unsupervised learning) in training data 1604.
- Model selection and training 1506: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1508: This may include evaluating the performance of a trained model (e.g., the trained machine-learning program 1602) on a separate testing dataset. This can help determine if the model is overfitting or underfitting and if it is suitable for deployment.
- Prediction 1510: This involves using a trained model (e.g., trained machine-learning program 1602) to generate predictions on new, unseen data.
- Validation, refinement or retraining 1512: This may include updating a model based on feedback generated from the prediction phase, such as new data or user feedback.
- Deployment 1514: This may include integrating the trained model (e.g., the trained machine-learning program 1602) into a larger system or application, such as a web service, mobile app, or IoT device. This can involve setting up APIs, building a user interface, and ensuring that the model is scalable and can handle large volumes of data.

FIG. 16 illustrates two example phases, namely a training phase 1608 (part of the model selection and trainings 1506) and a prediction phase 1610 (part of prediction 1510). Prior to the training phase 1608, feature engineering 1504 is used to identify features 1606. This may include identifying informative, discriminating, and independent features for the effective operation of the trained machine-learning program 1602 in pattern recognition, classification, and regression. In some examples, the training data 1604 includes labeled data, which is known data for pre-identified features 1606 and one or more outcomes.

Each of the features 1606 may be a variable or attribute, such as individual measurable property of a process, article, system, or phenomenon represented by a data set (e.g., the training data 1604). Features 1606 may also be of different types, such as numeric features, strings, vectors, matrices, encodings, and graphs, and may include one or more of content 1612, concepts 1614, attributes 1616, historical data 1618 and/or user data 1620, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1608, the machine-learning pipeline 1600 uses the training data 1604 to find correlations among the features 1606 that affect a predicted outcome or prediction/inference data 1622.

With the training data 1604 and the identified features 1606, the trained machine-learning program 1602 is trained during the training phase 1608 during machine-learning program training 1624. The machine-learning program training 1624 appraises values of the features 1606 as they correlate to the training data 1604. The result of the training is the trained machine-learning program 1602 (e.g., a trained or learned model).

Further, the training phase 1608 may involve machine learning, in which the training data 1604 is structured (e.g., labeled during preprocessing operations), and the trained machine-learning program 1602 implements a relatively simple neural network 1626 capable of performing, for example, classification and clustering operations. In other examples, the training phase 1608 may involve deep learning, in which the training data 1604 is unstructured, and the trained machine-learning program 1602 implements a deep neural network 1626 that is able to perform both feature extraction and classification/clustering operations.

A neural network 1626 may, in some examples, be generated during the training phase 1608, and implemented within the trained machine-learning program 1602. The neural network 1626 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1626 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1626 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1608, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1626 is iteratively trained by adjusting model parameters to minimize a specific loss function or maximize a certain objective. The system can continue to train the neural network 1626 by adjusting parameters based on the output of the validation, refinement, or retraining block 1512, and rerun the prediction 1510 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1626 even after deployment 1514 of the neural network 1626. The neural network 1626 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1610, the trained machine-learning program 1602 uses the features 1606 for analyzing query data 1628 to generate inferences, outcomes, or predictions, as examples of a prediction/inference data 1622. For example, during prediction phase 1610, the trained machine-learning program 1602 is used to generate an output. Query data 1628 is provided as an input to the trained machine-learning program 1602, and the trained machine-learning program 1602 generates the prediction/inference data 1622 as output, responsive to receipt of the query data 1628. Query data can include a prompt, such as a user entering a textual question or speaking a question audibly. In some examples, the system generates the query based on an interaction function occurring in the system, such as a user interacting with a virtual object, a user sending another user a question in a chat window, or an object detected in a camera feed.

In some examples the trained machine-learning program 1602 may be a generative AI model. Generative AI is a term that may refer to any type of artificial intelligence that can create new content from training data 1604. For example, generative AI can produce text, images, video, audio, code or synthetic data that are similar to the original data but not identical.

Some of the techniques that may be used in generative AI are:
- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1622 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: gathering interaction data from use of one or more interaction functions by a user on one or more interaction clients; accessing a camera feed of a camera system from an Extended Reality (XR) device; analyzing a combination of data corresponding to the interaction data and the camera feed using a first machine learning model to identify a priority for individual media content items; determining that a first subset of media content items is of a higher priority than a second subset of media content items; and displaying at least a portion of the media content items on the XR device of the user, the first subset of the media content items displayed differently than the second subset of the media content items based on the identified priority.

In Example 2, the subject matter of Example 1 includes, wherein the operations further comprise analyzing the camera feed with a second machine learning model to identify environmental characteristics of the user, wherein analyzing the combination of data corresponding to the interaction data and the camera feed includes analyzing the combination of data corresponding to the interaction data and the environmental characteristics.

In Example 3, the subject matter of Example 2 includes, wherein the camera feed includes one or more objects displayed in the camera feed, wherein the environmental characteristics include an identification of the one or more objects.

In Example 4, the subject matter of Examples 1-3 includes, wherein the operations further comprise generating a prompt for the user based on the interaction data, the prompt corresponding to an intent of the user, wherein analyzing the combination of data corresponding to the interaction data and the camera feed includes analyzing the combination of data corresponding to the prompt and the camera feed.

In Example 5, the subject matter of Examples 1-4 includes, wherein the operations further comprise, in response to the first subset being of higher priority than the second subset, highlighting or annotating text in the first subset.

In Example 6, the subject matter of Examples 1-5 includes, wherein the one or more interaction clients include the XR device.

In Example 7, the subject matter of Examples 1-6 includes, wherein the operations further comprise, in response to the first subset being of higher priority than the second subset, increasing a displayed size of the first subset or decreasing the displayed size of the second subset of media content items.

In Example 8, the subject matter of Examples 1-7 includes, the operations further comprise, in response to the first subset being of higher priority than the second subset, hiding a third subset of media content items, the first and second subset having a higher priority than the third subset.

In Example 9, the subject matter of Examples 1-8 includes, wherein the operations further comprise, in response to the first subset being of higher priority than the second subset, displaying the first subset of media content items in one color and subsequently displaying the second subset of media content items in another color.

In Example 10, the subject matter of Example 9 includes, wherein the first subset of media content items is initially displayed in red, and the second subset of media content items is subsequently displayed in a non-red color.

In Example 11, the subject matter of Examples 1-10 includes, wherein the operations further comprise, in response to the first subset being of higher priority than the second subset: displaying the first subset of media content items without rendering the second subset of media content items on the XR device; and in response to a lapse of a time period, displaying the second subset of media content items.

In Example 12, the subject matter of Examples 1-11 includes, wherein the priority is based on a physical hazard for the user within a distance threshold.

In Example 13, the subject matter of Examples 1-12 includes, wherein the interaction data includes data in different modalities, wherein the system processes the interaction data using a second machine learning model to generate features in latent space, wherein analyzing the combination of data corresponding to the interaction data and the camera feed includes analyzing the features in latent space.

In Example 14, the subject matter of Examples 1-13 includes, wherein a first media content item of the first subset comprises a content augmentation, whereby the content augmentation augments, modifies, and/or overlays content onto the camera feed with one or more digital elements, the digital elements include at least one of: an image, an animation, or audio, wherein displaying the media content items comprises displaying the camera feed with the content augmentation applied to the camera feed to the user.

In Example 15, the subject matter of Example 14 includes, wherein the operations further comprise: analyzing a combination of data corresponding to the interaction data and the camera feed using a second machine learning model to generate the content augmentation.

In Example 16, the subject matter of Examples 14-15 includes, wherein the operations further comprise: displaying a second selectable user interface element; and in response to a user selection of the second selectable user interface element, capturing a picture or video of the camera feed with the applied content augmentation.

In Example 17, the subject matter of Examples 1-16 includes, wherein the first machine learning model is trained to identify a priority for individual media content items based on inputted interaction data and camera feeds.

In Example 18, the subject matter of Examples 1-17 includes, wherein the operations further comprise: training the first machine learning model by: identifying historical interaction data of users, corresponding camera feeds, and expected priorities for sample media content items; applying the historical interaction data and corresponding camera feeds to the first machine learning model to receive output priorities for individual sample media content items; comparing the output priorities with the expected priorities to determine a loss parameter; and updating a characteristic of the first machine learning model based on the loss parameter.

Example 19 is a method comprising: gathering interaction data from use of one or more interaction functions by a user on one or more interaction clients; accessing a camera feed of a camera system from an Extended Reality (XR) device; analyzing a combination of data corresponding to the interaction data and the camera feed using a first machine learning model to identify a priority for individual media content items; determining that a first subset of media content items is of a higher priority than a second subset of media content items; and displaying the media content items on the XR device of the user, the first subset of the media content items displayed differently than the second subset of the media content items based on the identified priority.

Example 20 is a non-transitory computer-readable storage medium storing instructions that, when executed by at least one processor, cause the at least one processor to perform operations comprising: gathering interaction data from use of one or more interaction functions by a user on one or more interaction clients; accessing a camera feed of a camera system from an Extended Reality (XR) device; analyzing a combination of data corresponding to the interaction data and the camera feed using a first machine learning model to identify a priority for individual media content items; determining that a first subset of media content items is of a higher priority than a second subset of media content items; and displaying the media content items on the XR device of the user, the first subset of the media content items displayed differently than the second subset of the media content items based on the identified priority.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor; and
   at least one memory component storing instructions that, when executed by the at least one processor, cause the at least one processor to perform operations comprising:
      gathering interaction data from use of one or more interaction functions by a user on one or more interaction clients in a first modality;
      processing the interaction data in the first modality using a first machine learning model to generate first features in latent space;
      accessing a camera feed of a camera system from an Extended Reality (XR) device in a second modality;
      processing the camera feed in the second modality using the first machine learning model to generate second features in latent space;
      analyzing a combination of data corresponding to the first features and the second features using a second machine learning model to identify a priority for media content items;
   determining that a first subset of media content items is of a higher priority than a second subset of media content items; and
   displaying at least a portion of the media content items on the XR device of the user, the first subset of the media content items displayed differently than the second subset of the media content items based on the identified priority.

2. The system of claim 1, wherein the operations further comprise analyzing the camera feed with a third machine learning model to identify environmental characteristics of the user, wherein analyzing the combination of data corresponding to the interaction data and the camera feed includes analyzing the combination of data corresponding to the interaction data and the environmental characteristics.

3. The system of claim 2, wherein the camera feed includes one or more objects displayed in the camera feed, wherein the environmental characteristics include an identification of the one or more objects.

4. The system of claim 1, wherein the operations further comprise generating a prompt for the user based on the interaction data, the prompt corresponding to an intent of the user, wherein analyzing the combination of data corresponding to the interaction data and the camera feed includes analyzing the combination of data corresponding to the prompt and the camera feed.

5. The system of claim 1, wherein the operations further comprise, in response to the first subset being of higher priority than the second subset, highlighting or annotating text in the first subset.

6. The system of claim 1, wherein the one or more interaction clients include the XR device.

7. The system of claim 1, wherein the operations further comprise, in response to the first subset being of higher priority than the second subset, increasing a displayed size of the first subset or decreasing a displayed size of the second subset of media content items.

8. The system of claim 1, the operations further comprise, in response to the first subset being of higher priority than the second subset, hiding a third subset of media content items, the first and second subset having a higher priority than the third subset.

9. The system of claim 1, wherein the operations further comprise, in response to the first subset being of higher priority than the second subset, displaying the first subset of media content items in one color and subsequently displaying the second subset of media content items in another color.

10. The system of claim 9, wherein the first subset of media content items is initially displayed in red, and the second subset of media content items is subsequently displayed in a non-red color.

11. The system of claim 1, wherein the operations further comprise, in response to the first subset being of higher priority than the second subset:
displaying the first subset of media content items without rendering the second subset of media content items on the XR device; and
in response to a lapse of a time period, displaying the second subset of media content items.

12. The system of claim 1, wherein the priority is based on a physical hazard for the user within a distance threshold.

13. The system of claim 1, wherein a first media content item of the first subset comprises a content augmentation, whereby the content augmentation augments, modifies, and/or overlays content onto the camera feed with one or more digital elements, the digital elements include at least one of: an image, an animation, or audio,
wherein displaying the media content items comprises displaying the camera feed with the content augmentation applied to the camera feed to the user.

14. The system of claim 13, wherein the operations further comprise:
analyzing a combination of data corresponding to the interaction data and the camera feed using a third machine learning model to generate the content augmentation.

15. The system of claim 13, wherein the operations further comprise:
displaying a second selectable user interface element; and
in response to a user selection of the second selectable user interface element, capturing a picture or video of the camera feed with the applied content augmentation.

16. The system of claim 1, wherein the second machine learning model is trained to identify a priority for individual media content items based on inputted interaction data and camera feeds.

17. The system of claim 1, wherein the operations further comprise:
training the second machine learning model by:
identifying historical interaction data of users, corresponding camera feeds, and expected priorities for sample media content items;
applying the historical interaction data and corresponding camera feeds to the first second machine learning model to receive output priorities for individual sample media content items;
comparing the output priorities with the expected priorities to determine a loss parameter; and
updating a characteristic of the second machine learning model based on the loss parameter.

18. A method comprising:
gathering interaction data from use of one or more interaction functions by a user on one or more interaction clients in a first modality;
processing the interaction data in the first modality using a first machine learning model to generate first features in latent space;
accessing a camera feed of a camera system from an Extended Reality (XR) device in a second modality;
processing the camera feed in the second modality using the first machine learning model to generate second features in latent space;
analyzing a combination of data corresponding to the first features and the second features using a second machine learning model to identify a priority for media content items;
determining that a first subset of media content items is of a higher priority than a second subset of media content items; and
displaying at least a portion of the media content items on the XR device of the user, the first subset of the media content items displayed differently than the second subset of the media content items based on the identified priority.

19. A non-transitory computer-readable storage medium storing instructions that, when executed by at least one processor, cause the at least one processor to perform operations comprising:
gathering interaction data from use of one or more interaction functions by a user on one or more interaction clients in a first modality;
processing the interaction data in the first modality using a first machine learning model to generate first features in latent space;
accessing a camera feed of a camera system from an Extended Reality (XR) device in a second modality;
processing the camera feed in the second modality using the first machine learning model to generate second features in latent space;
analyzing a combination of data corresponding to the first features and the second features using a second machine learning model to identify a priority for media content items;
determining that a first subset of media content items is of a higher priority than a second subset of media content items; and
displaying at least a portion of the media content items on the XR device of the user, the first subset of the media content items displayed differently than the second subset of the media content items based on the identified priority.

* * * * *